(12) United States Patent  (10) Patent No.: US 7,979,625 B2
Le et al.  (45) Date of Patent: Jul. 12, 2011

(54) SPI BANK ADDRESSING SCHEME FOR MEMORY DENSITIES ABOVE 128MB

(75) Inventors: Anthony Le, San Jose, CA (US);
Malcolm Kitchen, Bilsthorpe (GB);
Jackson Huang, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 596 days.

(21) Appl. No.: 11/945,292

(22) Filed: Nov. 27, 2007

(65) Prior Publication Data

US 2009/0138626 A1    May 28, 2009

(51) Int. Cl.
*G06F 13/28* (2006.01)
(52) U.S. Cl. .............. 711/103; 711/165; 711/E12.008; 710/22; 710/23
(58) Field of Classification Search .................. None
See application file for complete search history.

(56) References Cited

U.S. PATENT DOCUMENTS

| | | | | |
|---|---|---|---|---|
| 5,293,594 | A | * | 3/1994 | Nojiri et al. .............. 711/220 |
| 6,067,267 | A | * | 5/2000 | Lo ............................... 365/221 |
| 6,385,704 | B1 | | 5/2002 | Rao et al. |
| 6,658,553 | B1 | * | 12/2003 | Ding et al. .................... 712/210 |
| 7,069,352 | B2 | | 6/2006 | Pezzini |
| 2008/0127225 | A1 | | 5/2008 | Mullis et al. |

OTHER PUBLICATIONS

U.S. Appl. No. 11/945,316, filed Nov. 27, 2007, Anthony Le et al.
Non-Final Office Action Dated Oct. 28, 2010 for U.S. Appl. No. 11/945,316. 23 pages.
Notice of Allowance dated Apr. 15, 2011 for U.S. Appl. No. 11/945,316.19 Pages.

* cited by examiner

*Primary Examiner* — Hetul Patel
(74) *Attorney, Agent, or Firm* — Eschweiler & Associates, LLC (57) ABSTRACT

Systems and methods of addressing two or more banks of memory utilizing a single-bank serial peripheral interface and an at least three-byte address protocol are provided. In one embodiment, a serial peripheral interface comprises a serial processing component configured to address one of the memory banks using the three-byte addressing scheme, and to write data to or read data from the addressed bank, and a bank register pointer component coupled to the serial processing component, the pointer component comprising two or more bank register pointers associated with respective memory banks, and configured to select one of the memory banks based on the two or more bank register pointers, wherein the bank register pointer component selects one of the two or more memory banks, and the serial processing component writes data to or reads data from the selected bank of memory according to the three-byte addressing scheme.

20 Claims, 6 Drawing Sheets

SPI BANK ADDRESSING SCHEME FOR MEMORY DENSITIES ABOVE 128MB

FIELD OF INVENTION

The present invention relates generally to peripheral interface devices and the like, and in particular, to a system and method of addressing two or more banks of memory utilizing a single-bank serial peripheral interface device and a three-byte addressing protocol.

BACKGROUND OF THE INVENTION

Many different types and styles of memory exist to store data for computers and similar type systems. For example, random access memory (RAM), dynamic random access memory (DRAM), static random access memory (SRAM), read only memory (ROM), programmable read only memory (PROM), electrically programmable read only memory (E-PROM), electrically erasable programmable read only memory (EEPROM) and flash memory are all presently available to accommodate data storage.

Each type of memory has its own particular advantages and disadvantages. For example, DRAM and SRAM allow individual-bits of data to be erased one at a time, but such memory loses its data when power is removed. EEPROM can alternatively be easily erased without extra exterior equipment, but has reduced data storage density, lower speed, and higher cost. EPROM, in contrast, is less expensive and has greater density but lacks ease of erasability.

Flash memory, has become a popular type of memory because it combines the advantages of the high density and low cost of EPROM with the electrical erasability of EEPROM. Flash memory can be rewritten and can hold its contents without power, and thus is nonvolatile. It is used in many portable electronic products, such as cell phones, portable computers, voice recorders, etc. as well as in many larger electronic systems, such as cars, planes, industrial control systems, etc.

Flash memory is generally constructed of many memory cells where, generally, single bits of data are stored in and read from respective memory cells. The cells are generally programmed by hot electron injection and erased by Fowler-Nordheim tunneling or other mechanisms. As with many aspects of the semiconductor industry, there is a continuing desire and effort to achieve higher device packing densities and increase the number of memory cells on a semiconductor wafer. Similarly, increased device speed and performance are also desired to allow more data to be stored on smaller memory devices.

Individual flash memory cells are organized into individually addressable units or groups, which are accessed for read, program, or erase operations through address decoding circuitry. The individual memory cells are typically comprised of a semiconductor structure adapted for storing a bit of data and includes appropriate decoding and group selection circuitry, as well as circuitry to provide voltages to the cells being operated upon.

As with many aspects of the semiconductor industry, there is a continuing desire to scale down device dimensions to achieve higher device packing densities on semiconductor wafers. Similarly, increased device speed and performance are also desired to allow more data to be stored on smaller memory devices. Accordingly, there are ongoing efforts to, among other things, increase the number of memory cells that can be packed on a semiconductor wafer (or die).

For example, another type of flash memory is dual element nitride storage flash memory, which allows multiple bits to be stored in a single cell. In this technology, a memory cell is essentially split into two identical (mirrored) or complementary regions, each of which is formulated for storing one of two independent bits or elements. Each dual element nitride storage flash memory cell, like a traditional cell, has a gate, a source, and a drain. However, unlike a traditional stacked gate cell in which the source is always connected to an electrical source and the drain is always connected to an electrical drain, respective dual element nitride storage flash memory cells can have the connections of the source and drain reversed during operation to permit the storing of two bits or elements.

In the continued effort to scale down device dimensions and to achieve higher device packing densities, increasingly large memory arrays or groupings are sought-out. Such increased memory groupings may put additional accessing and control duties on the processor or central processing unit (CPU) utilizing these large memory groupings, particularly where the more complex multi-level and multi-bit memory arrays are used. In addition, ever increasing numbers of peripheral devices also demand attention of the processor to which they are attached. One way that these demands can be off-loaded from the CPU is by utilizing a serial peripheral interface (SPI) to take over such memory access/control and peripheral interfacing duties.

However, as such peripheral needs and memory sizes continue to grow, the addressing requirements of current SPI devices will also tend to grow beyond the current 3-byte addressing scheme which limits memory addressing capability to 128 Mb. In addition, the 3-byte addressing is often hard-coded in the processors of current SPI-processor based chip-sets. Although new SPI-processor chip-sets could be designed that overcome these 3-byte addressing limitations, such system redesigns could be costly and time consuming and may not allow the use of current and legacy devices.

In view of the foregoing, a continued need exists for an improved SPI system and method of addressing larger arrays of flash memory cells using current and legacy devices that allow backward compatibility without costly and time consuming redesign.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later.

The present invention provides a system and method of addressing two or more banks (e.g., each memory bank comprising 128 Mb) of memory utilizing a single-bank serial peripheral interface (SPI) device and a three-byte addressing protocol, for example, for programming, reading, or erasing a larger array (e.g., four 128 Mb memory banks totaling 512 Mb, or 256 banks totaling 32 Gb) of multi-bit and multi-level flash memory cells. A memory "bank" herein, represents a memory size of 128 Mb (megabits) or 16 MB (megabytes), which is the upper limit of addressability for a 24 bit or three-byte address, comprising three 8-bit bytes.

In one or more embodiments, a serial peripheral interface system is provided operable to address two or more banks of memory (e.g., each memory bank comprising 128 Mb) utilizing a single-bank serial peripheral interface (e.g., can address up to 128 Mb). The system comprises the single-bank serial peripheral interface configured to address a selected bank of memory using a three-byte addressing scheme and to communicate with at least one peripheral, the interface operable to write data to or read data from the selected bank of memory, and a bank register pointer component operably coupled to the single-bank serial peripheral interface, the pointer component comprising first and second bank register pointers associated with respective first and second banks of memory, and configured to select one of the first and second banks of memory using the first and second bank register pointers, wherein the pointer selects one of the first and second banks of memory, and the single-bank serial peripheral interface writes data to or reads data from the selected bank of memory according to the three-byte addressing scheme.

In another embodiment, a serial peripheral interface comprises a serial processing component configured to address one of the memory banks using the three-byte addressing scheme, and to write data to or read data from the addressed bank, and a bank register pointer component coupled to the serial processing component, the pointer component comprising two or more bank register pointers associated with respective memory banks, and configured to select one of the memory banks based on the two or more bank register pointers, wherein the bank register pointer component selects one of the two or more memory banks, and the serial processing component writes data to or reads data from the selected bank of memory according to the three-byte addressing scheme.

In addition, the system and method of the present invention is applicable to and reliable for various memory technologies.

In one implementation, the two or more banks of memory comprise multi-bit multi-level flash memory.

In another implementation, the first and second memory banks individually comprise a maximum memory size which can be addressed by three 8-bit bytes.

In still another embodiment, the single-bank serial peripheral interface is operable to address a maximum memory size of 128 Mb using the three-byte addressing scheme.

In yet another embodiment, the bank register pointer component comprises four bank register pointers and is configured to select one of four memory banks associated therewith.

In one embodiment, the four memory banks individually comprise a maximum memory size addressable by a 24 bit address.

In one embodiment, the memory banks further comprises a multi-bit flash memory.

In another embodiment, the multi-bit flash memory further comprises a multi-level flash memory.

The present invention also provides a method of addressing two or more banks of memory utilizing a single-bank serial peripheral interface and a three-byte address protocol, comprising selecting a first bank of memory using a first bank register pointer, writing data to or reading data from the first memory bank utilizing the single-bank serial peripheral interface and a first three-byte address of the three-byte address protocol, selecting a second bank of memory using a second bank register pointer, and writing data to or reading data from the second memory bank utilizing the single-bank serial peripheral interface and a second three-byte address of the three-byte address protocol.

In another embodiment, the method further comprises selecting a third bank of memory using a third bank register pointer, writing data to or reading data from the third memory bank utilizing the single-bank serial peripheral interface and a third three-byte address of the three-byte address protocol, selecting a fourth bank of memory using a fourth bank register pointer, and writing data to or reading data from the fourth memory bank utilizing the single-bank serial peripheral interface and a fourth three-byte address of the three-byte address protocol.

The present invention thereby provides a method of addressing larger arrays (e.g., >128 Mb) of flash memory cells using current and legacy based SPI-processor devices that allow backward compatibility without costly and time consuming redesign.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

DETAILED DESCRIPTION OF THE INVENTION

One or more aspects of the present invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the present invention. It may be evident, however, to one skilled in the art that one or more aspects of the present invention may be practiced with a lesser degree of these specific details. In other instances, well-known structures and devices are shown in block diagram form in order to facilitate describing one or more aspects of the present invention.

Improvements in the density of memory devices translate to increased memory capacity. Density and thus capacity is a major consideration in the cost of fabrication and the marketability of memory devices, and is directly related to the amount of real estate used to store and access information or data on a semiconductor chip. As indicated, achieving higher density memory arrays continue to require more addressing capability of processors and serial peripheral interface (SPI) devices. Current processors are often hard coded to provide a 3-byte address serially communicated with a current SPI device, which is limited to addressing up to 128 Mb or 16 MB. The present invention will allow current and legacy based processor devices (backward compatibility) a method of overcoming the 3-byte addressing limitation without a costly and time consuming redesign.

That is, the present invention provides a method of addressing larger arrays (e.g., >128 Mb) of flash memory cells that allows backward compatibility using existing processor devices. Future devices may use separate SPI command opcodes (operation codes) for read, write, and erase commands, which may double the number of commands. These new commands may require a 4-byte address scheme to address up to 32 Gb of memory, in contrast to the current 3-byte address scheme which is conventionally limited to 128 Mb of memory. The new 4-byte opcode, however, may not be compatible with some existing processors, which hard code for the 3-byte address scheme. Thus, the bank addressing scheme or SPI Extended Address Protocol (SPI-EAP) of the present invention allows addressing above 128 Mb, while maintaining backward compatibility with the current 3-byte addressing scheme.

Similarly, it will be appreciated that the SPI extended address protocol of the present invention could also be applied to the 4-byte opcodes to address memory arrays greater than 32 Gb, by also utilizing the bank addressing scheme described herein.

Figure 1:
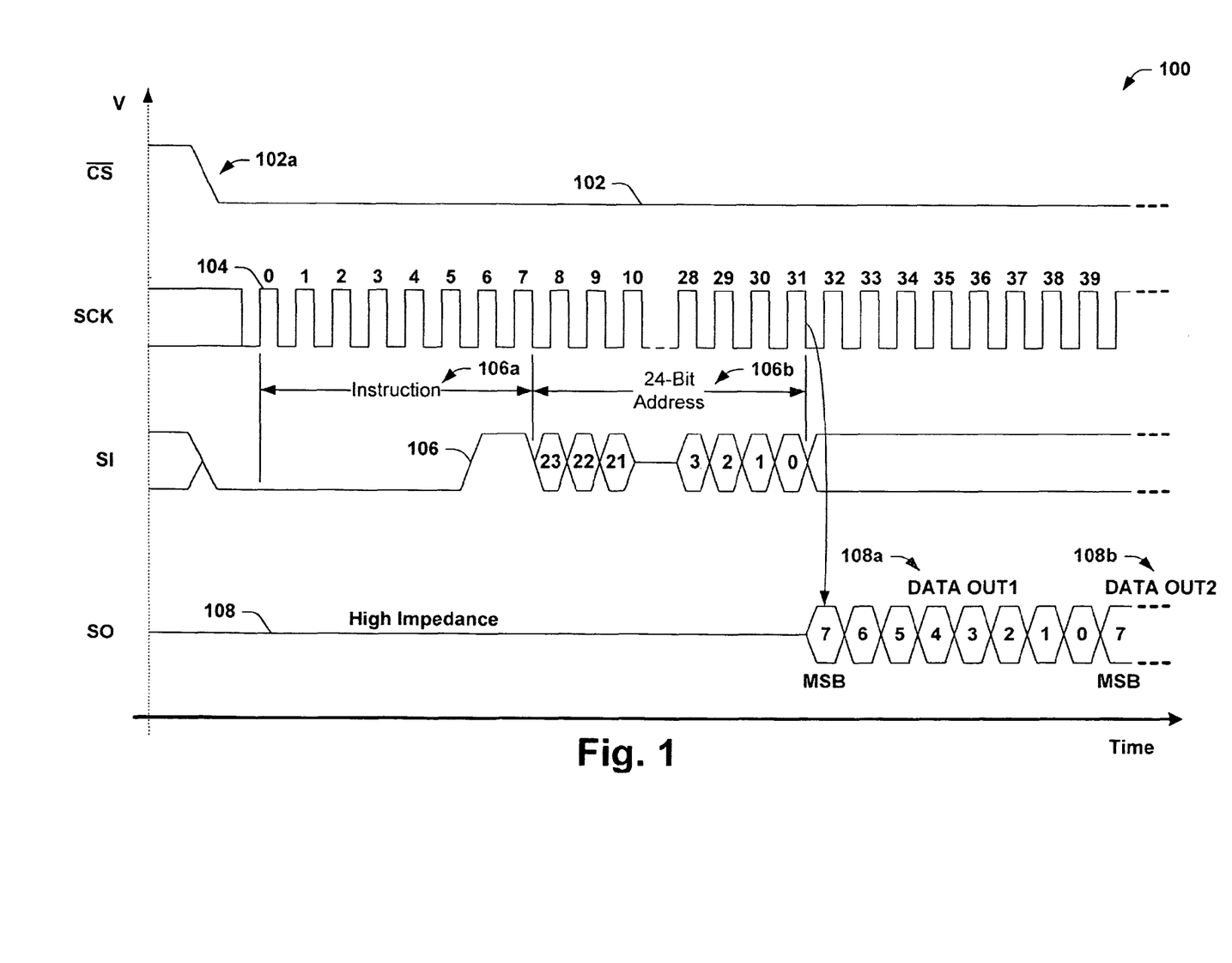
FIG. 1 is a timing diagram illustration of an exemplary 3-byte addressing scheme used by a serial peripheral interface (SPI) and a processor to address a 128 Mb bank of memory cells such as dual element nitride storage flash memory cells during memory read and write operations, in accordance with the SPI extended address protocol of the present invention.

Referring initially to FIG. 1, a timing diagram is presented of an exemplary 3-byte addressing scheme 100 used by a serial peripheral interface (SPI) and a processor to address two or more banks (e.g., memory banks comprising 128 Mb each) of memory cells such as dual element nitride storage flash memory cells during memory read and write operations, using the SPI extended address protocol in accordance with the present invention. The 3-byte addressing scheme 100 comprises, for example, initially selecting the SPI device by driving the chip select bar input pin CS 102 to a logic low state as indicated at the low-going edge 102a. During the rising edges of serial clock signal SCK 104, an instruction opcode (e.g., 03H) is provided to the SPI from the processor during instruction timing 106a on serial input signal SI 106, which is followed by a 3-byte address (e.g., A23-A0) being latched in during the 24 bit address timing 106b. Thereafter, the memory contents, at the identified address, is shifted out on the serial output signal SO 108 during DATA OUT1 timing 108a, and DATA OUT2 timing 108b, for example, starting with MSB bit 7 and serially shifting out each data bit on the falling edge of each serial clock SCK 104 cycle continuing to LSB bit 0 in each 8-bit data byte.

As indicated previously, the 3-byte addressing scheme 100 may be hard coded into conventional processor/SPI chipsets, thus, one goal of the present SPI extended addressing scheme is to utilize current and legacy hardware despite the current 3-byte addressing limitation of 128 Mb.

Figure 2:
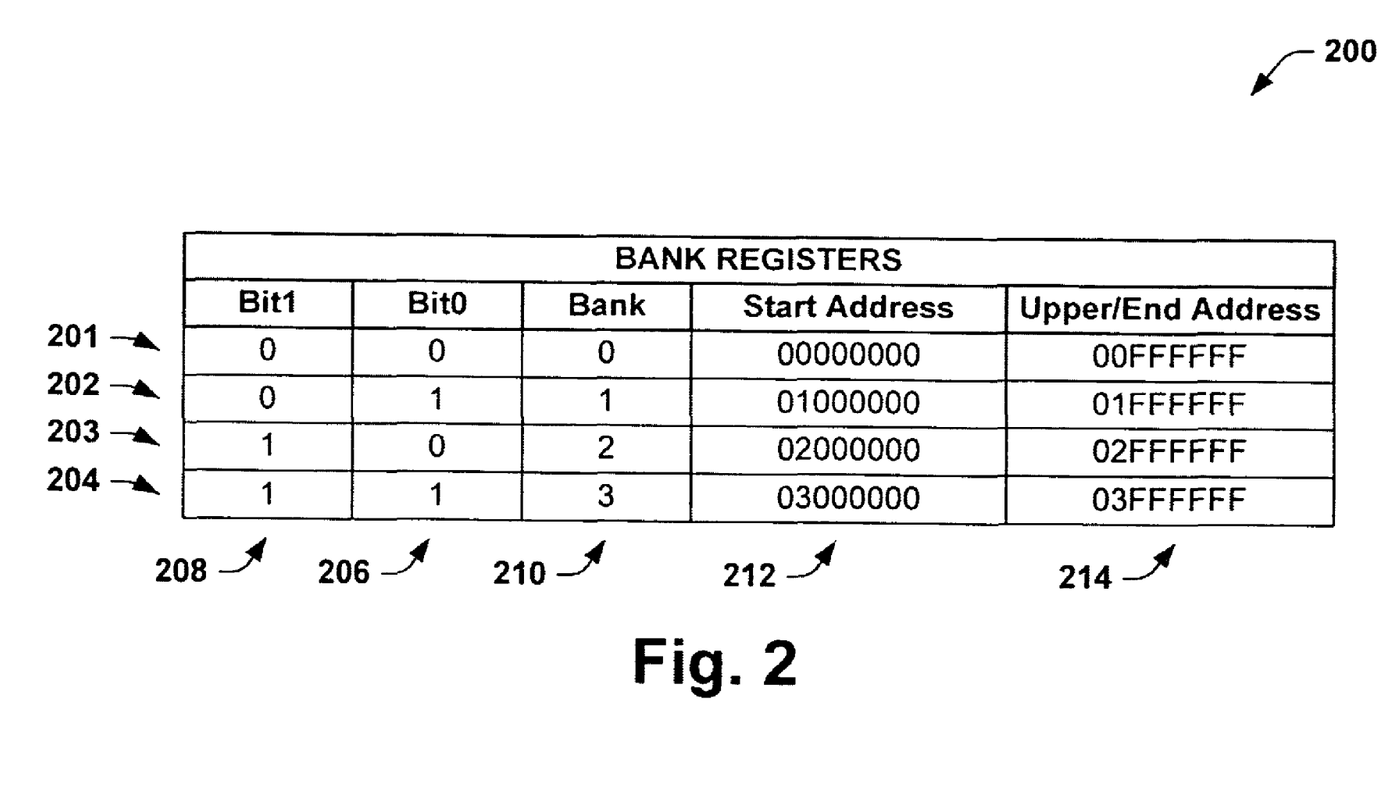
FIG. 2 is a chart of exemplary bank registers such as may be used to point to and select from among four bank registers each operable to address up to 128 Mb of data using the SPI extended address protocol of the present invention.

FIG. 2 illustrates a chart of exemplary bank registers 200 such as may be used to point to or select from among, for example, four banks of memory, wherein each bank of memory is operable to address up to 128 Mb of data using the SPI extended address protocol of the present invention.

Thus, to overcome the current 3-byte and 128 Mb addressing limitation, the present invention provides a plurality of bank registers 200 or a bank register pointer component 200 operably coupled to a single-bank serial peripheral interface (e.g., a 128 Mb SPI). For example, the pointer component 200 of FIG. 2 comprises four bank registers 201-204 which point to four respective banks of memory 210, wherein each bank comprises, for example, 128 Mb. These four respective memory banks 210 can be identified by, pointed to, or otherwise selected using two bits, for example, Bit0 206 and Bit1 208. Each 128 Mb memory bank 210 has a corresponding starting address 212 and an upper or end address 214, which can be retained in or managed by, for example, firmware or software either in the SPI, the processor, or within another suitable device.

To restate this another way; a bank register pointer component comprises first 201 and second 202 bank register pointers associated with respective first and second banks of memory 210 (e.g., 0, 1), and configured to select one of the first and second banks of memory 210 (e.g., 0, 1) using the first and second bank register pointers 201/202, wherein the pointer selects one of the first and second banks of memory, and the single-bank serial peripheral interface writes data to or reads data from the selected bank of memory according to the three-byte addressing scheme.

Although four bank registers 201-204 and four respective memory banks 210 are illustrated and described in the present example of FIG. 2, the inventors appreciate that any number of bank registers, for example, N (e.g., 256) bank registers may be utilized to point to or otherwise select N (e.g., 256) respective memory banks 210 which may be used in this scheme in order to extend the addressing capability beyond a hard coded 3-byte, a 4-byte, or ultimately, an N-byte addressing scheme. In accordance with the extended address protocol of the present invention, just as the bank registers of the 3-byte addressing scheme point to or select from among 128 Mb memory banks, the bank registers of a 4-byte addressing scheme point to or select from among 32 Gb memory banks, and ultimately, the bank registers of an N-byte addressing scheme point to or select from among $2^{(N \times 8)}$ bit memory banks. Thus the present invention is suitable for any memory technology and memory size greater than or equal to that which is addressable by the 3-bytes of the 3-byte addressing scheme (e.g., 128 Mb).

Figure 3A:
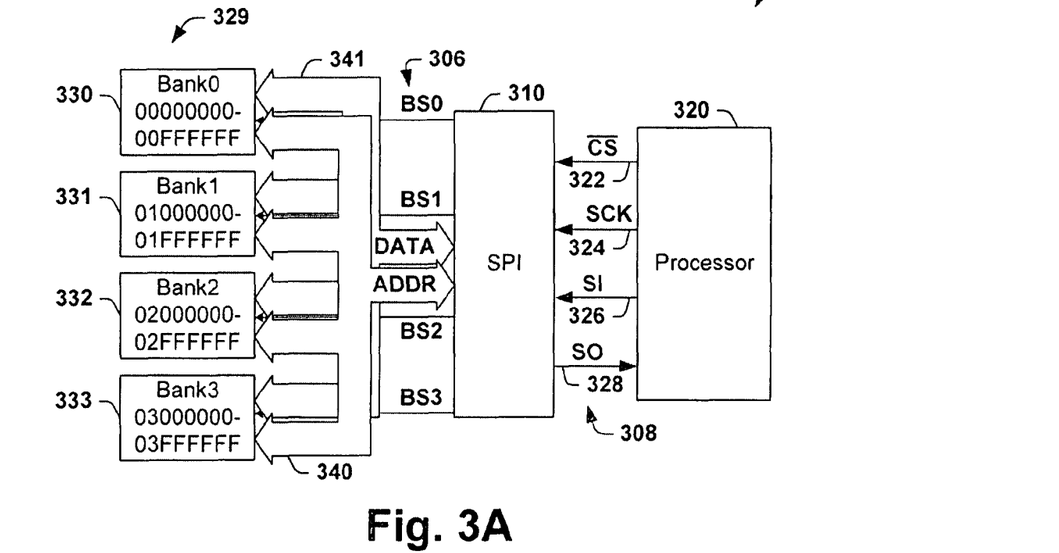
FIGS. 3A and 3B are functional diagrams of an interface system employing a single-bank SPI used to address four 128 Mb banks of flash memory cells in accordance with an aspect of the present invention using the four bank registers of FIG. 2 and the 3-byte addressing scheme of FIG. 1, according to the SPI extended address protocol of the present invention.

FIG. 3A illustrates an exemplary interface system 300 employing a single-bank SPI 310 used to address an array 329 of four 128 Mb banks of flash memory cells 330-333 in accordance with an aspect of the present invention using-four bank registers similar to those (e.g., 201-204) of FIG. 2 to point to the four memory banks 330-333, according to the SPI extended address protocol (e.g., the 3-byte addressing scheme of FIG. 1) of the present invention. The interface system 300 may be serially coupled to a processor 320, for example, by a 4-wire serial bus 308, comprising a chip select CS 322, a serial clock SCK 324, a serial input 326, and a serial output 328. The processor 320 and SPI 310 serially communicate opcodes of instructions and addresses for writing to or reading from the selected bank of memory 329, for example, according to the 3-byte address scheme 100 of FIG. 1. The address and data information is communicated between the SPI 310 and the selected memory bank (330-333) on the address bus 340 and the data bus 341.

Figure 3B:
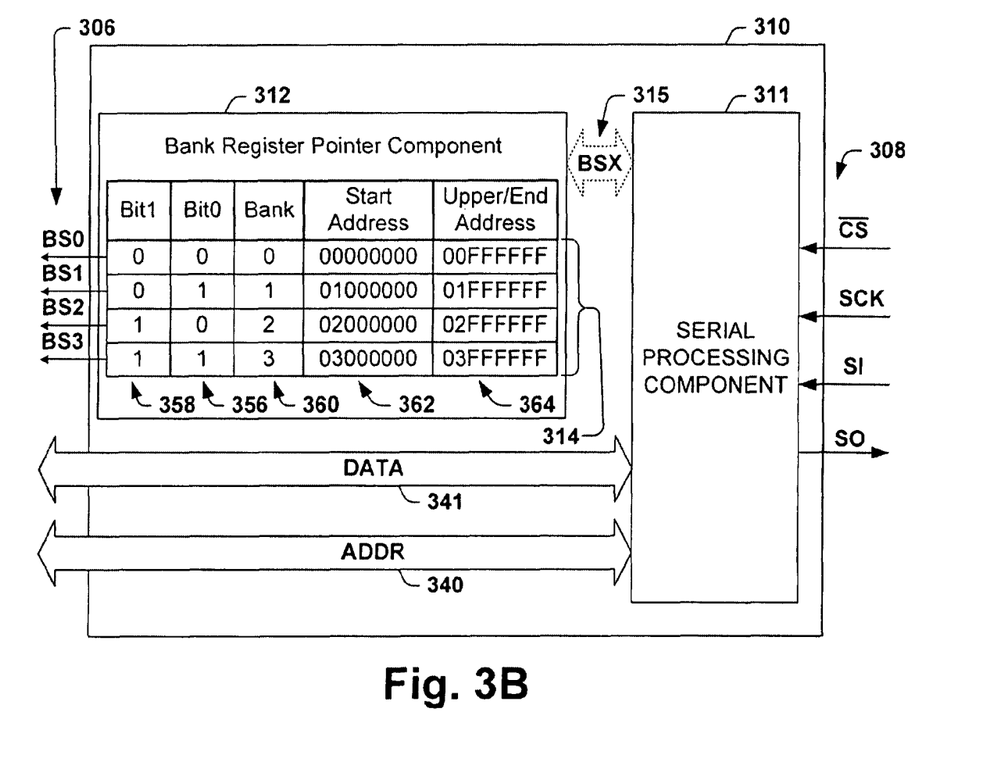

For example, FIG. 3B illustrates one embodiment of the SPI 310 of the interface system 300, comprising a serial processing component 311 operably coupled to a bank register pointer component 312. The serial processing component 311 handles all the usual serial processing function of a conventional SPI. In addition, serial processing component 311 is configured to address one bank of the two or more memory banks using at least a three-byte addressing scheme, and is operable to Write data to or read data from the addressed bank of memory (330-333). Serial processing component 311 is also configured to manage address bus 340 and data bus 341 communications to the addressed bank of memory (330-333).

In one embodiment, the bank register pointer component 312 comprises four bank registers 314 which are individually associated with respective memory banks 329 and are operable to select one of the memory banks 329, for example, using a bank select (BS0, BS1, BS2, and BS3) 306, for example, used as chip selects. It will be appreciated that the functional aspects of the bank selects 306, in selecting an appropriate memory bank 329, may be accomplished in firmware, hardware, or software either within the SPI 310, the processor 320, or elsewhere. Optionally, the serial processing component 311 may be operably coupled to the bank register pointer component 312, for example, via a bank selection indication BSX 315 for communication and/or coordination of the currently selected bank (e.g., BS0, BS1, BS2, or BS3) 306.

As in the description of the bank registers 200 of FIG. 2, the four respective memory banks 329 of FIG. 3A can be identified by, pointed to, or otherwise selected using two bank register bits, for example, Bit0 356 and Bit1 358 of the bank registers 314 of FIG. 3B. Accordingly, each 128 Mb memory bank 329 selected by the bank registers 314 has a corresponding starting address 362 and an upper or end address 364, which can be retained in or managed by, for example, firmware or software either in the SPI 310, the processor 320, or within another suitable device.

For example, if bank 0 (330) is selected by the bank register pointer component 312 by setting the two bank register bits Bit0 (356) and Bit1 (358) to a 0 state, then the corresponding starting address 362 is "0000000h" and an upper or end address 364 is "00FFFFFFh", and bank select BS0 is enabled to select bank 0 (330) of array 329. Similarly, if bank 3 (333) is selected by the bank register pointer component 312 by setting the two bank register bits Bit0 (356) and Bit1 (358) to a 1 state, then the corresponding starting address 362 is "03000000h" and an upper or end address 364 is "03FFFFFFh", and bank select BS3 is enabled to select bank 3 (333) of array 329.

Here again, although two bank register bits which provide four bank registers 314 and four respective memory banks 330-333 of array 329 are illustrated and described in the present example of FIGS. 3A and 3B, the inventors appreciate that any number of bank register bits and bank registers, for example, N (e.g., 256) bank registers may be utilized to point to or otherwise select N (e.g., 256) respective memory banks 210 which may be used in the SPI extended address protocol of the present invention to extend the addressing capability beyond that which is otherwise obtainable by 3-byte, a 4-byte, or ultimately, an N-byte address and a corresponding addressing scheme. For example, a bank register component (e.g., 312) comprising 8-bit bank registers having eight bank register bits Bit0-Bit7 may used to select from among 256 memory banks associated with an SPI according to the present protocol, to extend the SPI (e.g., SPI 320) addressing and data storage capability of a serially coupled processor (e.g., processor 320) by 256 or ($2^8$) times.

The above described solution is simple and cost effective since the present invention allows current and legacy based processor devices a method of overcoming the 3-byte addressing limitation without a costly and time consuming redesign.

Accordingly, it is another goal of the present invention to provide a method of addressing larger arrays (e.g., >128 Mb) of flash memory cells while maintaining backward compatibility using existing processors hard-coded, for example, with at least the current 3-byte addressing scheme. In particular, the method provides a method of addressing two or more banks of memory utilizing a single-bank serial peripheral interface utilizing at least a three-byte address and address protocol, comprising selecting a first bank of memory using a first bank register pointer, writing data to or reading data from the first memory bank utilizing the single-bank serial peripheral interface and a first at least three-byte address of the address protocol, selecting a second bank of memory using a second bank register pointer, and writing data to or reading data from the second memory bank utilizing the single-bank serial peripheral interface and a second at least three-byte address of the address protocol.

The method may also be referred to as a bank address scheme or an SPI extended address protocol (SPI-EAP) used in accordance with the present invention to extend the addressing capability of an SPI beyond that which is otherwise obtainable by a 3-byte, 4-byte, or ultimately, an N-byte address and their respective addressing scheme.

The method of the present invention is suitably implemented in serial peripheral interface devices using the extended address protocol of the present invention to address memory banks utilizing any device technologies including Phase change (PCM), Ferro-electric (FeRAM or FRAM), Programmable Metallization Cell (PMC), and any memory architectures including NAND, NOR, ORNAND, SRAM, Flash, and DRAM, as well as single bit, multi-bit and in particular, multi-level bits (MLB) memory devices having any number of levels.

In particular, the MLB cells of the memory banks that may be utilized in the present invention may comprise a single physical bit that can be programmed, for example, to three or more data levels or data states corresponding to three or more threshold voltages. Alternately, the MLB cell may comprise a multi-bit flash or mirror-bit cell having two physically distinct bits that may each be programmed to multiple levels such as four, wherein 16 possible states are then available. The method may be suitably implemented in a variety of flash memory architectures including single and dual sided ONO flash EEPROM, and other such single or multi-bit memory architectures that may be electrically programmed, and any such cell or variant is contemplated as falling within the scope of the present invention.

Although the methodology is illustrated and described hereinafter as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects of the present invention. Further, one or more of the acts may be carried out in one or more separate acts or phases.

Figure 4:
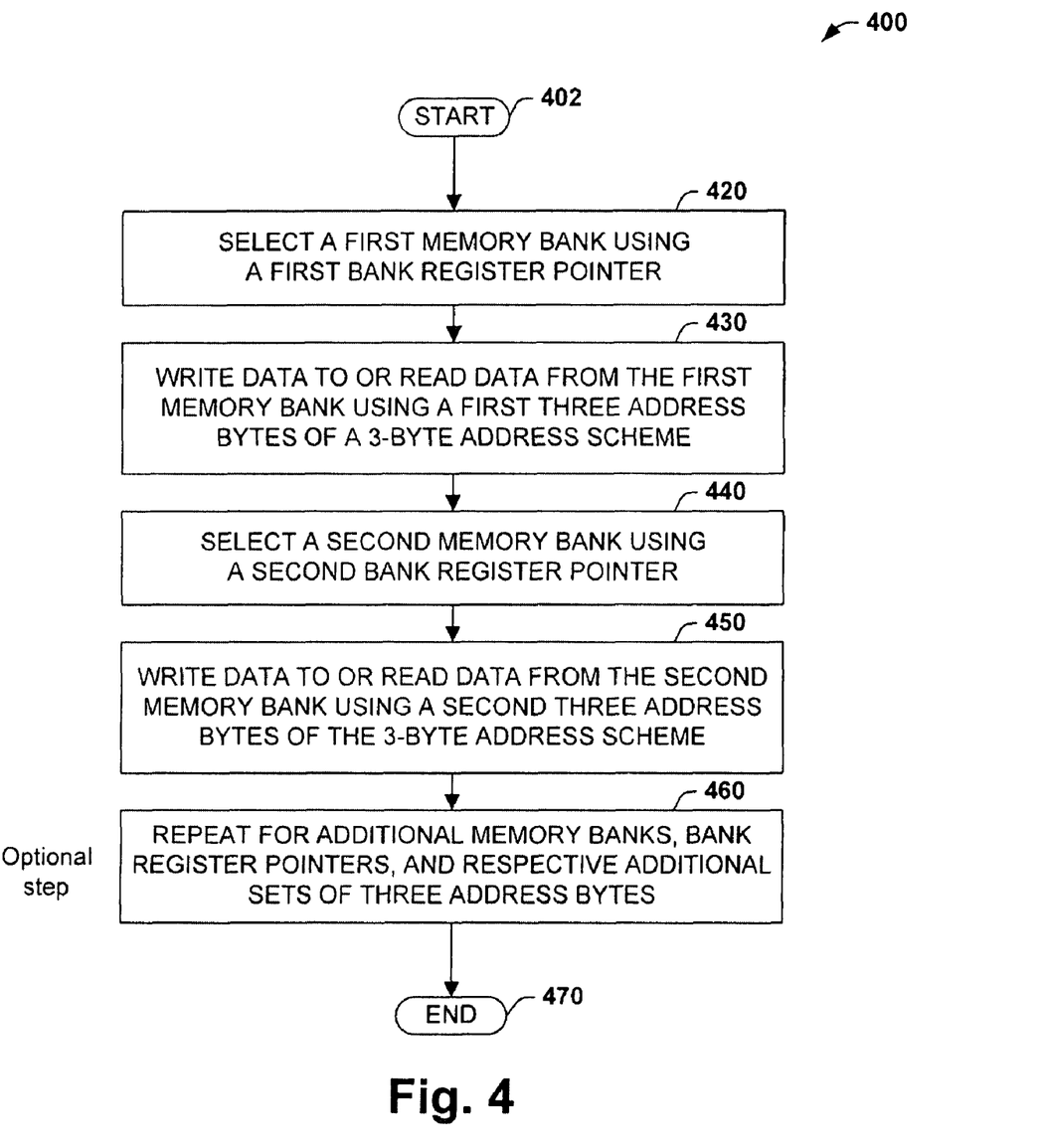
FIG. 4 is a flow diagram of an exemplary method of addressing two or more banks of memory utilizing a single-bank SPI and the four bank registers of FIGS. 3A/3B, and the 3-byte addressing scheme of FIG. 1, according to the SPI extended address protocol of the present invention.

FIG. 4 illustrates an exemplary method 400 of addressing two or more banks of memory utilizing a single-bank SPI (e.g., 310) and the bank registers (e.g., 314) of FIGS. 3A/3B, and at least a 3-byte address (e.g., 106b of FIG. 1) and addressing scheme similar to the 3-byte addressing scheme 100 of FIG. 1, according to the SPI extended address protocol of the present invention.

Assume for the sake of the following method discussion, a system interface similar to the system interface 300 of FIGS. 3A and 3B comprising an SPI 310 serially coupled to a processor 320, and at least two memory banks 329 (e.g., 330 and 331) coupled to the SPI 310 and selected by bit selects BS0 and BS1, respectively, and wherein the SPI 310 further comprises two or more bank registers 314 configured to select from among the two or more memory banks 329, for example, using the bit selects BS0 and BS1 of the bank registers 329. The following example will also assume a memory bank maximum size which is addressable by a 3-byte address (e.g., 128 Mb), however, it will be appreciated that the banks may also have a larger memory bank maximum size which is addressable by a 4-byte address (e.g., 32 Gb), and ultimately, memory bank maximum size which is addressable by an N-byte address (e.g., $2^{(N \times 8)}$ bits).

While the term "bank", "memory bank", or "array" is used throughout, it should be understood that such terms are not to be construed as limiting to one specified memory grouping size of cells or bits, but rather may apply to any grouping of memory cells, and MLB cells including single or multi-bit cells.

For example, method 400 of FIG. 4 includes selecting a first memory bank (e.g., bank0 330) at 420 using a first bank register pointer (e.g., BS0 306) of bank register 314.

At 430 data is written to or read from the first memory bank (e.g., bank0 330) using a first set of three address bytes according to a 3-byte addressing scheme (e.g., 3-byte scheme 100 of FIG. 1).

At 440 a second memory bank (e.g., bank1 331) is selected using a second bank register pointer (e.g., BS1 306) of bank register 314.

At 450 data is written to or read from the second t memory bank (e.g., bank1 331) using a second set of three address bytes according to a 3-byte addressing scheme (e.g., 3-byte scheme 100 of FIG. 1).

Thereafter at 460, additional memory banks (e.g., bank2 332, bank3 333, ... bankN), bank register pointers (e.g., BS2, BS3, ... BSN 306), and respective additional sets of 3-byte addresses (e.g., 3-byte scheme 100 of FIG. 1, 4-byte scheme 500 of FIG. 5) may optionally be utilized in accordance with the method 400 of the present invention to address the additional memory banks (e.g., bank2 332, bank3 333, ... bankN) of a still larger array (e.g., 329), whereafter the method ends at 470.

Figure 5:
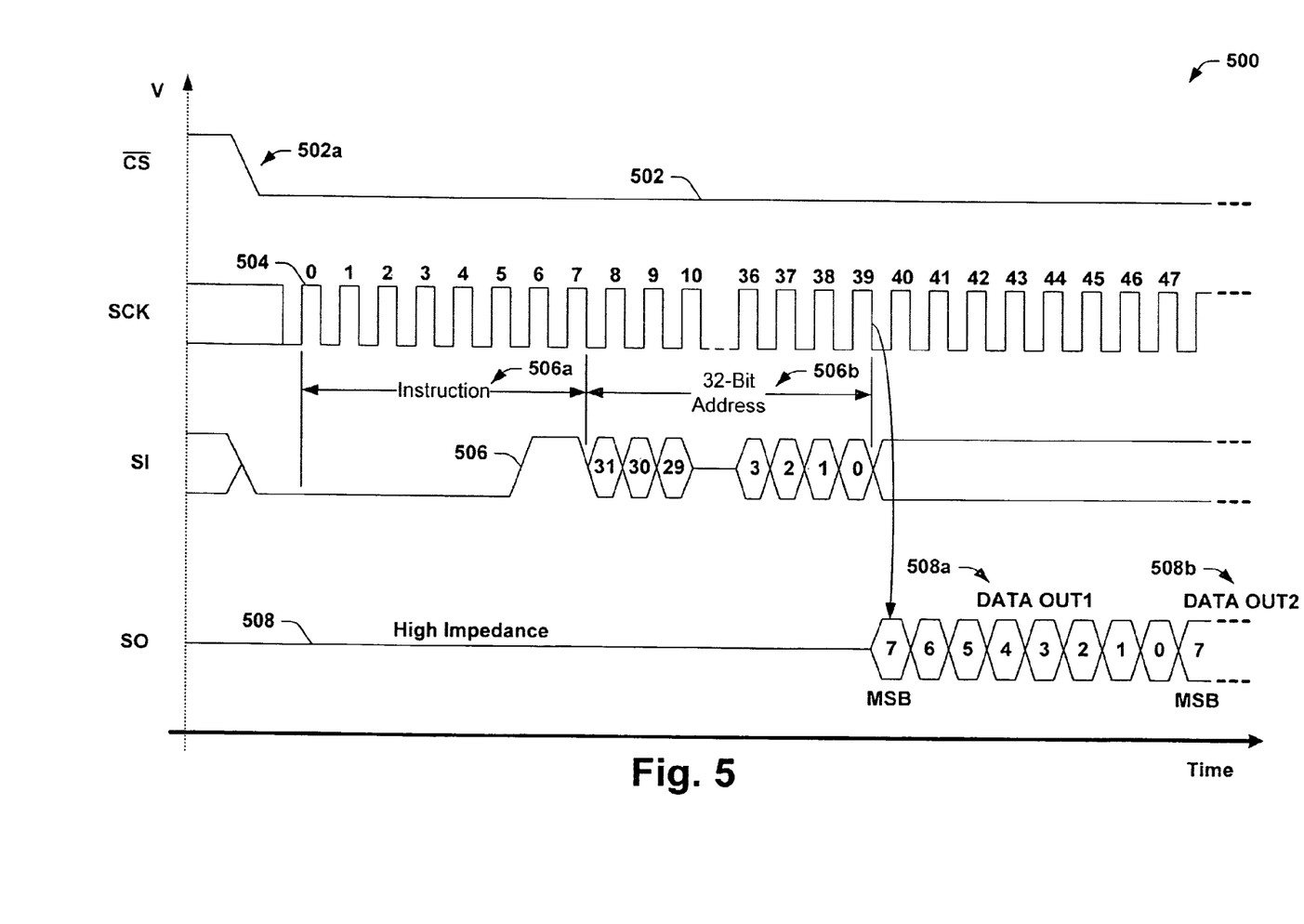
FIG. 5 is a timing diagram illustration of an exemplary 4-byte addressing scheme used by a serial peripheral interface (SPI) and a processor to address a 32 Gb bank of memory cells, such as dual element nitride storage flash memory cells during memory read and write operations, in accordance with the SPI extended address protocol of the present invention.

FIG. 5 illustrates an exemplary 4-byte addressing scheme 500 used by a serial peripheral interface (SPI) (e.g., SPI 310 of FIGS. 3A and 3B) and a processor (e.g., processor 320 of FIG. 3A) to address a 32 Gb bank of memory cells, such as dual element nitride storage flash memory cells during memory read and write operations, in accordance with the SPI extended address protocol, for example, similar to method 400 of FIG. 4 of the present invention to address two or more such 32 Gb banks of memory cells of a larger array (e.g., 329).

FIG. 5, illustrates a timing diagram of an exemplary 4-byte addressing scheme 500 used by a proposed serial peripheral interface (e.g., SPI 310 of FIGS. 3A and 31B) and a processor (e.g., processor 320 of FIG. 3A) to address a 32 Gb bank of memory cells such as dual element nitride storage flash memory cells during memory read and write operations, using the SPI extended address protocol (e.g., a 4-byte SPI-EAP) in accordance with the present invention. The 4-byte addressing scheme 500 comprises, for example, initially selecting the SPI device 310 by driving the chip select bar input pin CS 322 to a logic low state as indicated at the low-going edge 502a. During the rising edges of serial clock signal SCK 504, an instruction opcode (e.g., 03H) is provided to the SPI 310 from the processor 320 during instruction timing 506a on serial input signal SI 506 (e.g., S 326 of FIGS. 3A and 3B), which is followed by a 4-byte address (e.g., A31-A0) being latched in during the 32 bit address timing 506b. Thereafter, the memory contents, at the identified address, is shifted out on the serial output signal SO 508 (e.g., SO 328 of FIGS. 3A and 3B) during DATA OUT1 timing 508a, and DATA OUT2 timing 508b, for example, starting with MSB bit 7 and serially shifting out each data bit on the falling edge of each serial clock SCK 504 cycle continuing to LSB bit 0 in each 8-bit data byte. It may also be appreciated that the data at each memory location my comprise 16, 32, or 64 bits of data, for example.

As indicated previously, the 4-byte addressing scheme 500 may be hard coded into future processor/SPI chipsets, thus, one goal of the present SPI extended addressing scheme is also to utilize future and legacy hardware despite any future 4-byte addressing limitation of 32 Gb. Accordingly, the method of the SPI extended address protocol of the present invention provides SPI memory access beyond a future 4-byte addressing limitation of 32 Gb, by using a plurality of bank registers (e.g., 314) to select from among a plurality of 32 Gb memory banks (e.g., 330-333 ... ), as well as a future N-byte addressing limitation of $2^{(N \times 8)}$ bits, by using a plurality of bank registers (e.g., 314) to select from among a plurality of $2^{(N \times 8)}$ bit memory banks (e.g., 330-333 ... ).

Figure 6:
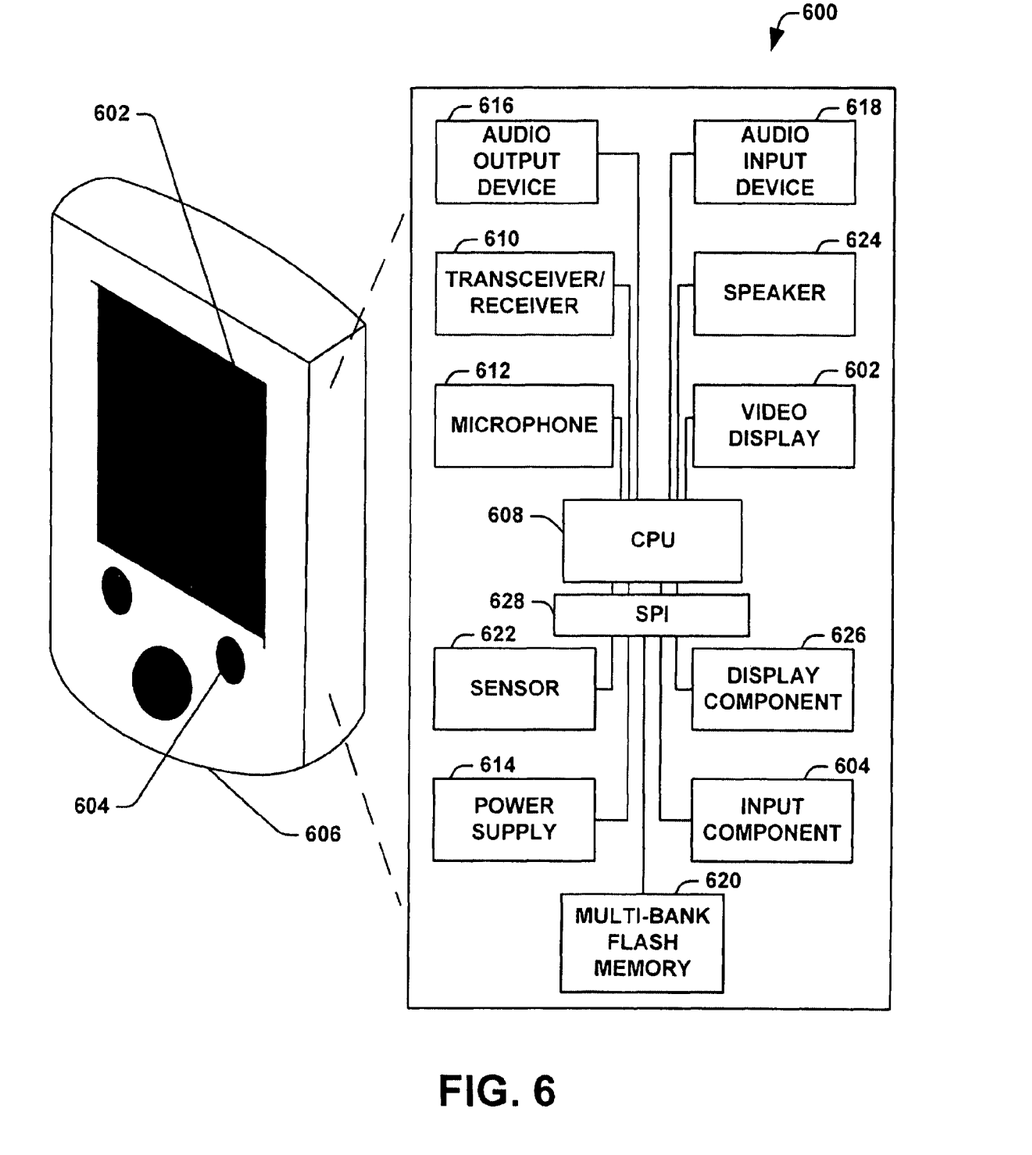
FIG. 6 is an isometric view of an electronic device and block diagram, wherein an SPI device may be utilized for addressing multiple banks of memory according to other aspects of the present invention.

FIG. 6 illustrates an exemplary (portable) electronic device, such as a communications device or Personal Data Assistant (PDA) 600, for example, wherein one or more aspects of the disclosure herein may be implemented, and wherein an SPI device and multiple bank registers may be utilized for addressing multiple banks of memory according to other aspects of the present invention. The communication device 600 comprises a video display 602, one or more user input components 604, a housing 606, a CPU 608, a transceiver and/or receiver 610, a microphone 612, a power supply 614, an audio output device 616, an audio input 618, a multi-bank memory 620, various sensors 622, speaker(s) 624, a display component 626, and a serial peripheral interface SPI 628. The serial peripheral interface SPI 628 of the communication device 600 may be used, for example, to serially interface (communicate) between the CPU 608 and the user input components 604, the power supply 614, the multi-bank memory 620, the various sensors 622, and the display component 626.

The serial peripheral interface SPI 628 may comprise, for example, a serial processing component configured to address one bank of the multi-bank memory 620 using at least a three-byte address (limited to 128 Mb) and an at least three-byte addressing scheme, the serial processing component operable to write data to or read data from the addressed bank of the multi-bank memory 620. The SPI 628 also comprises a bank register pointer component operably coupled to the serial processing component, the pointer component comprising two or more bank register pointers associated with respective memory banks of the multi-bank memory 620, and configured to select one of the memory banks based on the two or more bank register pointers. The bank register pointer component of SPI 628 selects a bank of the multi-bank memory 620, and the serial processing component writes data to or reads data from the at least three-byte address in the selected bank of the multi-bank memory 620 according to the at least three-byte addressing scheme, for example. Based on the inputs of the input component 604, the sensors 622, or the status of the power supply 614, and data stored in the multi-bank memory 620, for example, the display component 626 can display a graph, a photo, a map, a chart, a video, and the like.

The communication device 600 can also be configured to output data as an audio signal, for example a song, a message, a warning sound, various tones, recordings, etc. The communication device 600 can be configured to communicate with other electronic devices, for example computers, cell phones, other PDAs, and the like. The communication device 600 can also be configured to (wirelessly) transmit and/or receive data written to or read from the multi-bank memory 620. This is done utilizing the transmitter/receiver 610 to either transmit or receive data. Additionally, sensors 622 can be utilized to sense data external to the PDA 600, for example, temperatures, radiation levels, pressures, and the like. It will be appreciated that serial processor interface comprising a plurality of bank registers operable to select one of a plurality of memory banks for reading and writing operations as described herein can similarly be implemented in cell phones, laptops, computers, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A serial peripheral interface system operable to address two or more banks of memory utilizing a single-bank serial peripheral interface, comprising:
   the single-bank serial peripheral interface configured to address a selected bank of memory using at least a three-byte address and to communicate with at least one peripheral, the interface operable to write data to or read data from the selected bank of memory; and
   a bank register pointer component operably coupled to the single-bank serial peripheral interface, the pointer component comprising first and second bank register pointers associated with respective first and second banks of memory;
   wherein the first and second bank register pointers consist of data bits used to select one of the first and second banks of memory; and
   wherein the bank register pointer component selects one of the first and second banks of memory, and the single-bank serial peripheral interface writes data to or reads data from the at least three-byte address in the selected one of the first and second banks of memory.

2. The system of claim 1, wherein the first and second memory banks individually comprise a maximum memory size which can be addressed by at least three 8-bit bytes.

3. The system of claim 1, wherein the single-bank serial peripheral interface is operable to address a maximum memory size of 128 Mb using a three-byte addressing scheme.

4. The system of claim 1, wherein the selected bank of the first and second banks of memory comprises a maximum memory size addressable by one of a 24 bit, a 32 bit, a 48 bit, and a 64 bit address.

5. The system of claim 1, wherein the two or more banks of memory comprise multi-bit multi-level flash memory.

6. The system of claim 1, wherein the selected bank of memory is addressed using a data word consisting of memory address data bytes.

7. A serial peripheral interface operable to address two or more banks of memory, comprising:
   a serial processing component configured to address one bank of the two or more memory banks using at least a three byte address and an at least three-byte addressing scheme, and operable to write data to or read data from the addressed bank of memory; and
   a bank register pointer component operably coupled to the serial processing component, the pointer component comprising two or more bank register pointers associated with respective memory banks of the two or more memory banks, and configured to select one of the memory banks based on the two or more bank register pointers;
   wherein the bank register pointer component selects one of the two or more memory banks, and the serial processing component writes data to or reads data from the at least three-byte address in the selected bank of the two or more banks of memory according to the at least three-byte addressing scheme.

8. The interface of claim 7, wherein the two or more banks of memory individually comprise a maximum memory size which is addressable by three 8-bit bytes.

9. The interface of claim 8, wherein the serial processing component is operable to address a maximum memory size of 128 Mb using the three-byte addressing scheme.

10. The interface of claim 7, wherein the selected bank of the two or more banks of memory comprises a maximum memory size addressable by one of a 24 bit, a 32 bit, a 48 bit, and a 64 bit address.

11. The interface of claim 7, wherein the two or more banks of memory comprise multi-bit multi-level flash memory.

12. A method of addressing two or more banks of memory utilizing a single-bank serial peripheral interface and an at least three-byte address protocol, comprising:
   selecting a first bank of memory using a first bank register pointer consisting of data bits used to select the first bank of memory;
   writing data to or reading data from the first memory bank utilizing the single-bank serial peripheral interface and a first at least three-byte address of the at least three-byte address protocol;
   selecting a second bank of memory using a second bank register pointer consisting of data bits used to select the second bank of memory; and writing data to or reading data from the second memory bank utilizing the single-bank serial peripheral interface and a second at least three-byte address of the at least three-byte address protocol.

13. The method of claim 12, wherein the first and second banks of memory individually comprise a maximum memory size which is addressable by at least three 8-bit bytes.

14. The method of claim 12, wherein the first and second banks of memory comprise multi-bit multi-level flash memory.

15. The method of claim 12, further comprising:
selecting a third bank of memory using a third bank register pointer;
writing data to or reading data from the third memory bank utilizing the single-bank serial peripheral interface and a third at least three-byte address of the at least three-byte address protocol;
selecting a fourth bank of memory using a fourth bank register pointer; and
writing data to or reading data from the fourth memory bank utilizing the single-bank serial peripheral interface and a fourth at least three-byte address of the at least three-byte address protocol.

16. The method of claim 15, wherein the four banks of memory individually comprise a maximum memory size addressable by at least a 24 bit address.

17. The method of claim 12, wherein the selected first and second banks of memory are addressed using data words consisting of memory address data bytes.

18. An electronic device, comprising:
a user input configured to allow a user to input data;
a user output configured to output data to a user;
a memory configured to store and retrieve data, the memory comprising two or more memory banks;
a central processing unit (CPU) configured to receive and process the user input and to output the user output, and to store data in and retrieve data from the memory; and
a serial peripheral interface (SPI) operatively coupled to the user input, the user output and the memory, and configured to serially communicate data between the CPU and the user input, the user output and the memory, wherein the SPI is configured to address two or more banks of memory using a data word consisting of memory address data bytes.

19. The device of claim 18, wherein the serial peripheral interface (SPI) comprises:
a serial processing component configured to address one bank of the two or more memory banks using an at least three-byte addressing scheme, and operable to write data to or read data from the addressed bank of memory; and
a bank register pointer component operably coupled to the serial processing component, the pointer component comprising two or more bank register pointers associated with respective memory banks of the two or more memory banks, and configured to select one of the memory banks based on the two or more bank register pointers;
wherein the bank register pointer component selects one of the two or more memory banks, and the serial processing component writes data to or reads data from the selected bank of two or more memory banks according to the at least three-byte addressing scheme;
and wherein the two or more memory banks individually comprise a maximum memory size which can be addressed by at least three 8-bit bytes.

20. The device of claim 18, the electronic device comprising at least one of a communication device, Personal Data Assistant (PDA), cell phone, memory stick, flash drive device, video camcorder, voice recorder, USB flash drive, fax machine, flash memory, laptop, computer, scanner, MP3 player, digital camera, home video game console, hard drive and memory card.

\* \* \* \* \*